United States Patent [19]

Hopperdietzel

[11] Patent Number: 5,114,779
[45] Date of Patent: May 19, 1992

[54] SHAPED THERMOPLASTIC MATERIAL WITH FILLERS AND METHOD OF MAKING THE SAME

[75] Inventor: Siegfried Hopperdietzel, Selb, Fed. Rep. of Germany

[73] Assignee: Rehau AG & Co., Rehau, Fed. Rep. of Germany

[21] Appl. No.: 584,082

[22] Filed: Sep. 18, 1990

[30] Foreign Application Priority Data

Sep. 18, 1989 [DE] Fed. Rep. of Germany ....... 3931074

[51] Int. Cl.⁵ .................................. B29C 47/04
[52] U.S. Cl. ................................... 428/144; 264/134; 264/140; 264/211; 264/540; 428/147; 428/327; 428/328
[58] Field of Search ................. 264/177.2, 328.18, 540, 264/134, 140, 211; 428/147, 327, 328, 323, 35.8, 36.4, 144, 403, 404, 407

[56] References Cited

U.S. PATENT DOCUMENTS

| | | | |
|---|---|---|---|
| 3,954,379 | 5/1976 | Klocke | 425/505 |
| 3,988,494 | 10/1976 | McAdow | 428/328 |
| 4,005,054 | 1/1977 | Bonnefon et al. | 264/210.6 |
| 4,126,727 | 11/1978 | Kaminski | 428/144 |
| 4,238,537 | 12/1980 | Kerr | 428/35.8 |
| 4,239,797 | 12/1980 | Sachs | 428/147 |
| 4,348,312 | 9/1982 | Tung | 428/144 |
| 4,501,783 | 2/1985 | Hiragami et al. | 428/147 |
| 4,566,990 | 1/1986 | Liu et al. | 264/328.18 |
| 4,632,869 | 12/1986 | Park et al. | 428/327 |
| 4,713,273 | 12/1987 | Freedman | 428/323 |
| 4,826,638 | 5/1989 | Hopperdietzel | 264/140 |
| 4,900,611 | 2/1990 | Carroll, Jr. | 428/328 |
| 4,921,755 | 5/1990 | Carroll, Jr. et al. | 428/328 |

FOREIGN PATENT DOCUMENTS

| | | |
|---|---|---|
| 2255033 | 11/1972 | Fed. Rep. of Germany . |
| 2228677 | 12/1972 | Fed. Rep. of Germany . |
| 57-039927 | 3/1982 | Japan .................................. 264/540 |

Primary Examiner—Jan H. Silbaugh
Assistant Examiner—Catherine Timm
Attorney, Agent, or Firm—Spencer, Frank & Schneider

[57] ABSTRACT

A method of making a shaped thermoplastic article includes the following steps: mixing plastic filler particles of a maximum size of 0.7 mm to a thermoplastic material in a maximum percentage of about 15 weight percent for affecting a surface roughness of the article; processing the mixture resulting from the mixing step to obtain the shaped thermoplastic article; and maintaining the temperature of the mixture during the performance of the mixing and processing steps at a level below the melting temperature of the plastic filler particles.

18 Claims, No Drawings

SHAPED THERMOPLASTIC MATERIAL WITH FILLERS AND METHOD OF MAKING THE SAME

CROSS REFERENCE TO RELATED APPLICATION

This application claims the priority of Federal Republic of Germany Application No P3931074.4, filed Sep. 18th, 1989, the subject matter of which is incorporated herein by reference.

BACKGROUND OF THE INVENTION

This invention relates to the production of profiles, strips, tapes, plates and the like of a thermoplastic material with fillers which influence the characteristics of the plastic and which are added to the basic thermoplastic before shaping.

German Offenlegungsschrift (Non-examined Published Application) No. 2,228,677 discloses a plastic to which various fillers are added before the plastic is shaped. Examples of the fillers are calcium carbonate, asbestos, clay, kaolin and talcum. A small quantity of glass fibers can also be added to the substance. There is a high filler content of at least 300 and more parts by weight per 100 parts by weight of plastic. The glass fiber percentages, on the other hand, vary between 0.2 and 5 weight percent with reference to the total substance. The plastic substances which use these fillers and additives exhibit excellent processing characteristics and very good physical and mechanical characteristics such as reduced brittleness and improved abrasion resistance.

A plastic material, for example, polyvinyl chloride, enriched in the above-outlined manner can be processed into floor coverings. The drawback of such plastic materials, however, is that other fields of use are not available because of the high filler content.

German Patent No. 3,623,795, to which corresponds U.S. Pat No. 4,826,638, discloses the use of a fraction of hardened particles of an elastomer material as an additive to unhardened elastomer material before the latter is hardened. Particle sizes from 0.1 to 1 mm of hardened particles of an elastomer material can be added in an order of magnitude from 5 to 60 parts per every 100 parts of the unhardened elastomer material. Articles of elastomer material produced from this mixture such as, for example, silicone rubber, have a definitely irregular surface.

It is important in the manufacture of such products that exclusively hardened particles of a hardened elastomer material can be added to the unhardened elastomer material as the starting product. The hardened elastomer particles may be silicone or caoutchouc elastomers. Thermoplastics or other materials, such as polyesters and the like, are excluded from such treatment.

German Offenlegungsschrift (Non-examined Published Application) No. 2,255,033 discloses a method of introducing color pigments into the surface of plastic particles. The color pigments, which have a significantly higher melting point than the plastic particles, are embedded into the surface of the plastic particles as it begins to melt. In a second process step, the substance of the plastic particles is completely melted with the color pigment embedded in its surface, resulting in a completely died-through melt.

SUMMARY OF THE INVENTION

It is an object of the invention to provide articles of thermoplastic materials and a method of producing articles of thermoplastic materials such that the articles exhibit a special configuration of their surfaces in addition to the mechanical and chemical properties required for processing and later use.

This object and others which will become apparent as the specification progresses, are accomplished by the invention, according to which, briefly stated, particles of a plastic material which does not melt in the melt stream are introduced as influencing fillers to the basic thermoplastic material as, for example, surface roughness influencing fillers. Such particles are present in a maximum percentage of about 15 weight percent and have a maximum particle size of about 0.7 mm.

DETAILED DESCRIPTION OF THE INVENTION

The present invention provides a shaped thermoplastic material with fillers and a method for producing a shaped thermoplastic material with fillers. Particles of a plastic material which does not melt in the melt stream are added to the thermoplastic as fillers that influence the plastic's characteristics, for example, surface roughness influencing fillers. Since the particles are of a plastic material which does not melt in the melt stream, the melting temperature of the plastic material should be higher than the melting temperature of the thermoplastic material.

The basic thermoplastic used in the invention may be polyvinyl chloride (PVC), acrylonitrile butadiene styrene terpolymer (ABS) or polypropylene (PP). Other matrix materials may be used insofar as they can be processed with the particles to be added.

The particles for influencing the surface roughness may be, for example, polyterephthalate (polyester) particles. Such particles can be obtained, for example, in regular or irregular sizes from a polyester sheet. An ultra-thin layer of a metal—e.g aluminum—may be vapor-deposited on one or both sides of the polyester sheet. In this way, special effects can be produced on the surfaces of the manufactured end products by means of the particles that are visible on the outside. These effects may even be augmented in that before the particles are produced, the polyester sheet is covered with a lacquer coating which may be colored in any desired hue, in addition to the vapor-deposited metal layer. It is to be understood that the lacquer layer must be heat resistant to such an extent that the processing temperatures for the thermoplastic material will not denature the lacquer layer.

The particles may be cut, for example, in regular shapes from a polyester sheet. Such regular particles of smaller or larger dimensions may be combined to form a particle mixture which is able to impart a special configuration to the surface of the product.

In addition to the regular cutting of the particles in any desired dimensions and configurations, the particles may also be produced by grinding the starting product. The starting product composed, for example, of a polyester sheet may be ground at cold temperatures. The grinding may occur in ball mills or impact crushers in liquid nitrogen at, for example, −120° C. In these known grinding processes, the optimum particle sizes can be set so that only the desired particle fraction is produced along with a negligible amount of dust.

According to the present invention, the optimum particle size lies between about 0.002 mm and 0.7 mm, preferably between about 0.01 mm and 0.2 mm. These particles are added in a preferred quantity ratio of about 0.1 to 8 weight percent to every 100 parts of the basic thermoplastic material.

The basic thermoplastic material enriched in this way can be used to produce profiles, strips, tapes, plates, hoses, tubes and the like. They may be produced in an extrusion process, by injection molding, or by blow molding.

In processing the basic thermoplastic material with the particles according to the invention, the flexibility inherent in the particles is particularly significant. The particles made of polyester have similar processing characteristics as the basic thermoplastic material and have no abrasive characteristics which would adversely affect the processing machines.

Such abrasive characteristics would be present if the particles were composed, for example, of metal foils (such as aluminum) or quartz or the like. Although the addition of such particles would also affect the surface characteristics of the resulting products, the particles' sharp-edged faces embedded in the surface would be undesirable in many cases. In addition to the negative effect of such abrasive particles on the conveying regions of the processing machines, the end products would have poor surface characteristics so that the use of such particles is undesirable.

In contrast, the polyester particles of the present invention do not have a negative effect on the processing machines. During transport in the processing machines, the particles disposed in the edge regions of the starting matrix remain without difficulty at the surfaces of the conveying means until they reach the shaping tools. At the shaping tools the particles retain their sliding characteristics until they leave the processing machines.

Since the particles in the present invention do not bond with the melt stream of the thermoplastic material during processing, the particles lie embedded as foreign bodies in the cross section of the melt stream as well as at its boundary faces. In the cross section of the melt stream and in the cross section of the resulting finished product, the foreign bodies are fully surrounded by and enclosed in the matrix of the basic thermoplastic material. Due to the small quantity of particles as enclosed foreign bodies, they do not have a negative effect on the end products. The particles that eventually settle in the boundary regions contact the inner faces of the tools in the final phase of manufacture. These particles are more or less embedded in the matrix and, when manufactured in an extrusion process, create a special surface configuration of the end products upon leaving the tool gap. The particles embedded near the surface may give the surface the character of stone with the roughness of a stone surface, which is influenced by the size and quantity of the added particles.

The characteristics of the end product can be further varied by using particles having different surface colors. The particles may be coated on one or both sides, for example, with a colored lacquer of stone colors such as gray, brown, green or red. These different colored particles may be mixed together and added to the starting matrix to produce a specific coloration of the surface and of the cross section of the end products.

It is a significant characteristic of the end products produced according to the present invention that after manufacture they can be further mechanically worked. Since the special surface configuration of roughness and color design is present not only at the surface but also throughout the entire cross section of the end product, further mechanical working is possible.

The cross-sectional regions exposed by such mechanical working have approximately the same characteristics as the surfaces produced during manufacture of the product. Thus, the finished product has optimum use since it can be processed further after manufacture without quality loss on the surface or on the externally disposed cross-sectional regions.

In addition to extrusion, an injection molding process can be used in the present invention. However, since the final shaping of the products takes places in a static region in the injection molding process, rather than by a sliding movement along the tool surfaces, the particles are firmly pressed into the surface by the injection pressure so that the end products will have an almost smooth surface characteristic. The present invention's end products produced in an injection molding process have the appearance of a smooth, polished stone surface and may have the same color designs as extruded end products. End products produced in a blow-molding process have similar characteristics as the injection molded articles since once the two-part mold has been closed, the extruded semi-finished products are pressed against the surfaces of the closed mold halves by the application of internal blow pressure. Such articles, when finished, also have the appearance of a polished stone, at least on their exterior contours.

Due to the addition of particles, the extruded products can have a maximum roughness depth of 50 $\mu$m on their surfaces, depending on the size and quantity of the added particles. The preferred roughness depth is between about 10 $\mu$m and 40 $\mu$m. The roughness may be changed by the number and surface configuration of the added particles in order to suit the intended use of the end product.

The particles may also be produced from a duroplastic material. They may have a regular shape in the form of cut particles or an irregular shape. The irregular shape may be produced by grinding. Preferably, previously produced sheets are used as the starting materials for the production of the particles. These sheets may be colored throughout or by surface coating. The surface coloration may be made by lacquer coatings or the vapor-deposition of metal. Metal covered sheets may additionally have a transparent colored coating of lacquers to produce special optical characteristics.

The particles cut out of such sheets may be cut in regular shapes, such as squares, hexagons, rectangles, or in the shape of stars or the like. The use of different sizes of such regularly shaped cut particles permits the creation of special optical characteristics in the end products. It is also feasible to irregularly comminute the sheets to thus obtain an irregular effect in the cross section and on the surfaces of the end products.

The particles may be introduced directly into the mixture ready for processing or as color granules of increased concentration. Mixing the particles in the matrix may occur before the manufacturing step in a special mixing process, for example, by producing the granules. If dye concentrates are used, the mixing may also take place during processing of the basic thermoplastic material.

The roughness depth of the end products extruded according to one embodiment of the invention is a genuine roughness depth that can be discerned by touch and has the corresponding surface unevenness. The unevenness differs from a stamped surface which always has a certain similarity in the stamped patterns and does not imitate stone surfaces with a genuine appearance.

In order that those skilled in the art may better understand how the present invention may be practiced, the following examples are given only by way of illustration, and not by way of limitation.

EXAMPLE 1

A polyvinylchloride (PVC) matrix was used as the starting material. This starting material was mixed with 4 weight percent of the particles. The particles were a mixture of particles of sizes 0.01 mm and 0.4 mm. The particles were cut types represented at 2 parts of 0.01 mm and 2 parts of 0.4 mm, respectively.

The end product produced in an extrusion process had a roughness depth of about 40 µm.

EXAMPLE 2

Again, a polyvinyl chloride (PVC) matrix was used as the starting material. This starting material was mixed with 1 weight percent particles. In each case, 0.5 parts of particles of the size 0.01 mm and 0.5 parts of particles of the size 0.4 mm were used in the particle mixture. The particles were of the cut type.

A roughness depth of 15 µm was measured on the surfaces of the extruded end product.

EXAMPLE 3

Acrylonitrile butadiene styrene terpolymer (ABS) as the starting matrix was mixed with a quantity of 3 parts of particles of the size 0.02 mm.

The roughness depth of the extruded end product was approximately 35 µm.

EXAMPLE 4

A starting matrix of polypropylene (PP) was mixed with 1.5 parts of particles of the size 0.02 mm.

A roughness depth of about 30 µm was measured in the extruded end product.

It will be understood that the above description of the present invention is susceptible to various modifications, changes and adaptations, and the same are intended to be comprehended within the meaning and range of equivalents of the appended claims.

What is claimed is:

1. A method of making a shaped thermoplastic article, comprising the following steps:
   (a) mixing metal coated plastic filler particles of a size between about 0.1 mm and about 0.7 mm with a thermoplastic material, said metal coated plastic filler particles present in a percentage of between about 5 weight percent and about 15 weight percent compared to the weight of the thermoplastic material, for affecting a surface roughness of the article, and said metal coating of said metal coated plastic filler particles being a vapor deposited metal coating;
   (b) extruding the mixture resulting from step (a) to obtain the shaped thermoplastic article comprising said thermoplastic material and said metal coated plastic filler particles, said metal coated plastic filler particles being distributed throughout said shaped thermoplastic article, said surface roughness of the shaped thermoplastic article having a depth between about 10 and 40 µm; and
   (c) maintaining the temperature of the mixture during the performance of steps (a) and (b) below the melting temperature of said metal coated plastic filler particles.

2. A method as defined in claim 1, wherein said filler particles are foil particles of uniform size.

3. A method as defined in claim 1, wherein said filler particles are foil particles of non-uniform size.

4. A method as defined in claim 1, wherein said filler particles have a size between about 0.1 mm and about 0.2 mm.

5. A method as defined in claim 1, wherein the percentage of the particles mixed with the thermoplastic material is between about 7 weight percent and about 8 weight percent.

6. A method of making a shaped thermoplastic article, comprising the following steps:
   (a) vapor-depositing a metal coating on a plastic foil and producing metal coated plastic filler particles from said plastic foil,
   (b) mixing said metal coated plastic filler particles of a size between about 0.1 mm and about 0.7 mm with a thermoplastic material, said metal coated plastic filler particles present in a percentage of about 5 weight percent and about 15 weight percent compared to the weight of the thermoplastic material, for affecting a surface roughness of the article;
   (c) extruding the mixture resulting from step (b) to obtain the shaped thermoplastic article comprising said thermoplastic material on said metal coated plastic filler particles, said metal coated plastic filler particles being distributed throughout said shaped thermoplastic article, said surface roughness of the shaped thermoplastic article having a depth between about 10 and 40 µm; and
   (d) maintaining the temperature of the mixture during the performance of steps (b) and (c) below the melting temperature of said metal coated plastic filler particles.

7. A method as defined in claim 6, wherein the producing step comprises one of cutting and grinding.

8. A method of making a shaped thermoplastic article, comprising the following steps:
   (a) coating a plastic foil with a heat-resistant lacquer and producing lacquer coated plastic filler particles from said plastic foil,
   (b) mixing said lacquer coated plastic filler particles of a size between about 0.1 mm and about 0.7 mm with a thermoplastic material, said lacquer coated plastic filler particles present in a percentage of between about 5 weight percent and about 15 weight percent compared to the weight of the thermoplastic material, for affecting a surface roughness of the article;
   (c) extruding the mixture resulting from step (b) to obtain the shaped thermoplastic article comprising said thermoplastic material and said lacquer coated plastic filler particles, said lacquer coated plastic filler particles being distributed throughout said shaped thermoplastic article, said surface roughness of the shaped thermoplastic article having a depth between about 10 and 40 µm; and
   (d) maintaining the temperature of the mixture during the performance of steps (b) and (c) below the melting temperature of the lacquer coated plastic filler particles.

9. A method as defined in claim 8, wherein the producing step comprises one of cutting and grinding.

10. A shaped thermoplastic article obtained by a process comprising the following steps:
   (a) mixing metal coated plastic filler particles of a size between about 0.1 mm and about 0.7 m with a thermoplastic material, said metal coated plastic filler particles present in a percentage of between about 5 weight percent and about 15 weight percent compared to the weight of the thermoplastic material, for affecting a surface roughness of the article, and said metal coating of said metal coated plastic filler particles being a vapor deposited metal coating;
   (b) extruding the mixture resulting from step (a) to obtain the shaped thermoplastic article comprising said thermoplastic material and said metal coated plastic filler particles, said metal coated plastic filler particles being distributed throughout said shaped thermoplastic article, said surface roughness of the shaped thermoplastic article having a depth between about 10 and 40 μm; and
   (c) maintaining the temperature of the mixture during the performance of steps (a) and (b) below the melting temperature of the metal coated plastic filler particles.

11. A shaped thermoplastic article obtained by a process as defined in claim 10, wherein said filler particles are foil particles of uniform size.

12. A shaped thermoplastic article obtained by a process as defined in claim 10, wherein said filler particles are foil particles of non-uniform size.

13. A shaped thermoplastic article obtained by a process as defined in claim 10, wherein said filler particles have a size between about 0.1 mm and about 0.2 mm.

14. A shaped thermoplastic article obtained by a process as defined in claim 10, wherein the percentage of the particles mixed with the thermoplastic material is between about 7 and about 8 weight percent.

15. A shaped thermoplastic article obtained by a process comprising the following steps:
   (a) vapor-depositing a metal coating on a plastic foil and producing metal coated plastic filler particles from said plastic foil,
   (b) mixing said metal coated plastic filler particles of a size between about 0.1 mm and about 0.7 mm with a thermoplastic material, said metal coated plastic filler particles present in a percentage of between about 5 weight percent and about 15 weight percent compared to the weight of the thermoplastic material, for affecting a surface roughness of the article;
   (c) extruding the mixture resulting from step (b) to obtain the shaped thermoplastic article comprising said thermoplastic material and said metal coated plastic filler particles, said metal coated plastic filler particles being distributed throughout said shaped thermoplastic article, said surface roughness of the shaped thermoplastic article having a depth between about 10 and 40 μm; and
   (d) maintaining the temperature of the mixture during the performance of steps (b) and (c) below the melting temperature of the metal coated plastic filler particles.

16. A shaped thermoplastic article obtained by a process as defined in claim 15, wherein the producing step comprises one of cutting and grinding.

17. A shaped thermoplastic article obtained by a process comprising the following steps:
   (a) coating a plastic foil with a heat-resistant lacquer and producing lacquer coated plastic filler particles from said plastic foil,
   (b) mixing lacquer coated plastic filler particles of a size between about 0.1 mm and about 0.7 mm with a thermoplastic material, said lacquer coated plastic filler particles present in a percentage of between about 5 weight percent and about 15 weight percent compared to the weight of the thermoplastic material, for affecting a surface roughness of the article;
   (c) extruding the mixture resulting from step (b) to obtain the shaped thermoplastic article comprising said thermoplastic material and said lacquer coated plastic filler particles, said lacquer coated plastic filler particles being distributed throughout said shaped thermoplastic article, said surface roughness of the shaped thermoplastic article having a depth between about 10 and 40 μm; and
   (d) maintaining the temperature of the mixture during the performance of steps (b) and (c) below the melting temperature of the lacquer coated plastic filler particles.

18. A shaped thermoplastic article obtained by a process as defined in claim 17, wherein the producing step comprises one of cutting and grinding.

* * * * *